Feb. 24, 1970   R. J. JORDAN ET AL   3,497,683
CATAPULT DIGITAL END SPEED INDICATOR
Filed June 24, 1966
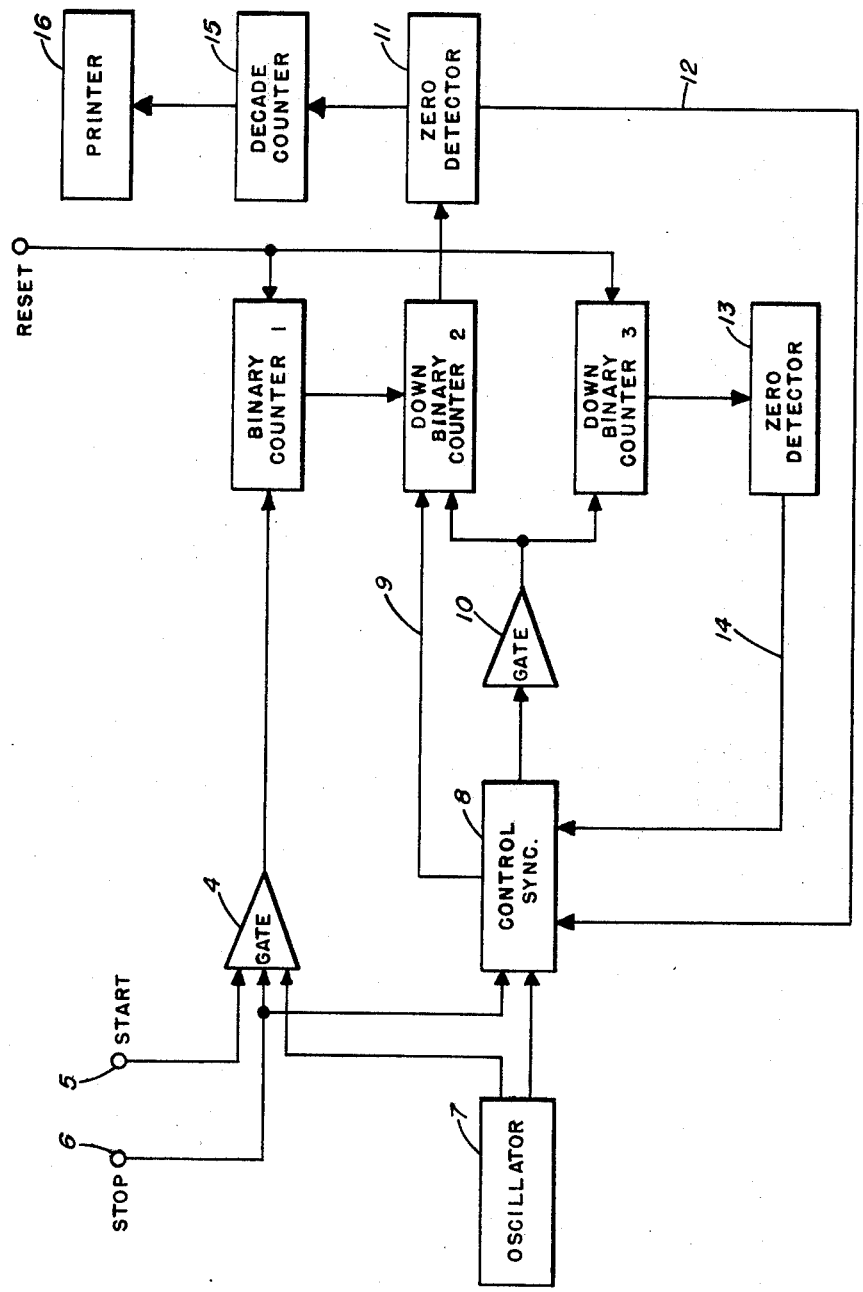
INVENTORS
ROBERT J. JORDAN
RUSSEL C. STETLER
ROBERT B. DAVIS
RONALD N. PHILLIPS
BY                    ATTORNEY
                      AGENT

United States Patent Office 3,497,683
Patented Feb. 24, 1970

3,497,683
CATAPULT DIGITAL END SPEED INDICATOR
Robert J. Jordan and Russel C. Stetler, Leonardtown, Robert B. Davis, Hollywood, and Ronald N. Phillips, Leonardtown, Md., assignors to the United States of America as represented by the Secretary of the Navy
Filed June 24, 1966, Ser. No. 560,962
Int. Cl. G06f 7/38; G06g 7/00
U.S. Cl. 235—92                                        6 Claims

ABSTRACT OF THE DISCLOSURE

Subject invention disclosure relates to a speed indicator using digital computers. The indicator comprises in combination binary counters, an oscillator and zero detector. Binary counter number one receives the number of bits developed by the oscillator during the time it takes an object to pass between two fixed points or traverse a predetermined distance. Binary counter number three is preset to contain a certain number of bits. The indicator determines the mathematical process of counting the number of times the bits accumulated in counter number one go into counter number three by counting down in counter number two, the bits in counter number one. The end result represents the speed of the object in traversing the predetermined distance.

---

The inventon described herein may be manufactured and used by or for the Government of the United States of America for governmental purposes without the payment of any royalties thereon or therefor.

The present invention relates to a speed indicator and more in particular to a digital computing system for measuring the catapult speed of an airplane.

The previous device used for measuring the end speed of an airplane launched from a catapult was a synchronous chronograph. The actual speed was determined by measuring the distance between marks made on the synchronous paper of the chronograph. Some of the disadvantages of this device are that the time to make the measurements is slow and that the accuracy of the speed is limited by the ability to measure the distance between the marks.

An object of the present invention is to provide a computer for electronically measuring the end speed of a catapult launched vehicle and to represent the end speed in a digital manner.

Another object of the present invention is to provide a visual digital readout and print of the velocity of an aircraft at the end of the catapult stroke.

A further object of the present invention is to provide for fast and automatic computation of the end speed of an aircraft as it leaves the catapult launcher.

Other objects, advantages and novel features of the invention will become apparent from the following detailed description of the invention when considered in conjunction with the accompanying drawing wherein:

The single figure is a block diagram of the catapult digital end speed indicator.

Referring now to the figure, binary counter 1, down binary counter 2, and down binary counter 3 are connected as shown to count down a group of pulses or a number of digital bits during a predetermined period of time. Counter 1 is controlled by gate 4 which in turn is actuated by the start and stop trips 5 and 6 located on the catapult mechanism (not shown). The distance between the start and stop trips 5 and 6 is accurately maintained. The input to gate 4 consists of pulses or digital bits from oscillator 7. In the launching of an airplane or vehicle near the end of the catapult stroke, the airplane operates the start trip 5 which actuates gate 4 for receiving digital bits from oscillator 7. Upon its operation, gate 4 transfer the digital bits to binary counter 1 which acts as an accumulator of the bits during the time of operation of gate 4. When the airplane has traveled the predetermined distance between trips 5 and 6, the stop trip 6 is actuated to stop the actuation of gate 4 whereby no more bits from oscillator 7 are transferred to binary counter 1. As a consequence, binary counter 1 accumulates only the number of bits available during the time interval between the tripping of the start and stop trips by the airplane.

The combination of counter gate 4 and oscillator 7 acts as a precise interval time measuring device. When the stop trip 6 is operated to turn off gate 4, the control sync circuit 8 is actuated which applies a logic 1 or sync pulse to counter 2 to set binary counter 2 for operation. Upon setting the counter 2 for operation, a second sync pulse from control sync 8 is applied to counter 2 to effect the transferring of the number of bits accumulated in binary counter 1 to down binary counter 2 and at the same time to allow the bits from the stable oscillator 7 to pass through the control sync through gate 10 to binary counter 2 and binary counter 3. Upon the application of the bits from the oscillator 7 to down binary counter 2, the number of transferred bits in down binary counter 2 will be matched or counted until there are no longer any transferred bits in down binary counter 2.

When the counting of the transferred bits of counter 1 has been completed by counter 2, a zero bit pulse is fed from binary counter 2 to zero detector 11. Upon receipt of the zero bit pulse in zero detector 11 a feedback pulse is sent to control sync 8 over line 12 which actuates the control sync 8 to restart binary counter 2 by sending the proper logic control sync pulse over line 9 to binary counter 2. By resetting binary counter 2, the same number of accumulated bits in counter 1 are transferred again to binary counter 2 and the counting down process of binary counter 2 is started again.

Before the operation of the present indicator down binary counter 3 is preloaded to contain a certain number of bits. At the same time that down binary counter 2 is counting down, oscillator pulse bits are fed through gate 10 to down binary counter 3 which counts down the predetermined number of preloaded bits therein.

The down binary counter 2 continues to count down and recount down until all the preloaded bits in binary counter 3 have been counted down. At this time when all the preloaded bits in counter 3 have been counted, a zero logic output pulse from counter 3 is fed to zero detector 13 which in turn feeds a stop pulse over line 14 to control sync 8 to stop its actuation.

As a result of this counting process of the indicator of the present invention, zero detector 11 detects the number of zero bit pulses or count downs of binary counter 2. The number of zero bit pulses detected by detector 11 are stored in and visually presented by decade counter 15. At the same time, the total number of zeros displayed by decade counter 15 are printed by printer 16 and would indicate the end speed of the airplane as it leaves the catapult mechanism.

For an explanation of the calculation by the computing system of the present invention, the following example is given. If the oscillator 7 has a frequency of 100 kilocycles per second, then the oscillator would supply one hundred thousand bits per second. This would mean that any bit passing through gate 4 to binary counter 1 would represent one-hundred-thousandth of a second. If the actual distance between the start and the stop trips 5 and 6 on the catapult is 2 feet and 200,000 bits have been stored or preloaded into counter 3, then each preloaded bit in down binary counter 3 represents one-hundred-thousandths of a foot. Now, if 10,000 bits are transferred to binary counter 1 between the operation of the start and stop trips 5 and 6 by the traversing of the airplane on the catapult, then the number of zeros detected from down binary counter 2 for the total counting down of counter 3 would be 20 which represents the end speed of the airplane in feet per second. This would be the number of times 10,000 bits of binary counter 1 transferred to counter 2 would go into the total number of preloaded bits in down binary counter 3. Thus, with this type of system no actual measurements are necessary by an operator which would induce additional errors in the calculation and the actual end speed of the airplane is automatically and visually represented and printed by the printer 16.

What is claimed is:

1. A digital computing system for measuring and indicating the end speed of a vehicle as it leaves a catapult launching mechanism comprising:

start means and stop means spaced apart being actuated by the vehicle traveling along the catapult launching mechanism;

time interval measuring means being actuated by said start and stop means for accumulating timed digital bits for the interval of time between the actuation of said start and stop means;

first down-counting means connected to said time interval measuring means for counting the number of said digital bits accumulated by said interval measuring means and establishing a first zero bit pulse when all the bits have been counted;

a first detecting means connected to said first down-counting means and for establishing a feedback pulse for enabling said first down-counting means to recount the accumulative bits of said time interval measuring means;

control sync means connected to said first down-counting means and said first detecting means being actuated by said stop means for supplying sync pulses to said first down-counting means for transferring said accumulated bits of said time interval measuring means to said first down-counting means and for initiating the counting of said accumulated bits in said first down-counting means and upon receiving a feedback pulse from said first detecting means retransferring said accumulated bits and recounting of said bits;

a second down-counting means connected to said control sync means being preloaded with a predetermined number of digital bits for counting down the predetermined number of bits at the same time of the counting down by first down-counting means of said accumulated digital bits;

said second down-counting means establishing a second zero bit pulse when all the preloaded predetermined number of digital bits has been counted whereby the control sync means stops the counting down of the first down-counting means and the total number of first zero bit pulses from said first down-counting means indicates the end speed of a vehicle.

2. A digital computing system of claim 1 comprising a second detecting means connected to said second down-counting means and said control sync means for receiving said second zero bit pulse from said second down-counting means for establishing a stop pulse for said control sync means for stopping its actuation at the end of the counting down of said preloaded digital bits of said second down-counting means.

3. A digital computing system of claim 2 comprising a decade counter connected to said first detecting means for summing the number of first zero bit pulses received by said first detecting means and indicating the end speed of a vehicle digitally.

4. A digital computing system of claim 3 comprising display and printing means connected to said decade counter and initiated by said decade means for indicating digitally and automatically in visual form the end speed of the vehicle.

5. A digital computing system of claim 1 wherein said first down-counting means comprises first down binary counter for receiving the accumulated digital bits from said time interval measuring means and said second down-counting means and comprises second down binary counter preloaded with a predetermined number of digital bits.

6. A digital computing system of claim 5 wherein said time interval measuring means comprises:

a gate means, a stable oscillating means and an accumulated binary counter, said gate means being connected to said start and stop means, to said stable oscillating means and to said accumulated binary counter whereby timed digital bits from said stable oscillator means are fed through said gate means to said accumulated binary counter during the interval of time of the operation of said start and stop means for accumulating digital bits in said accumulated binary counter;

said stable oscillator means connected to said control sync means for feeding timed digital bits through said control sync means to said first down binary counter and said second down binary counter after the operation of said stop means for enabling said first and second down binary counters to count down the number of accumulated digital bits and preloaded bits, respectively.

References Cited

UNITED STATES PATENTS

| | | | |
|---|---|---|---|
| 2,626,986 | 1/1953 | MacNichol et al. | 175—381 |
| 2,665,410 | 1/1954 | Burbeck | 324—68 |
| 2,702,367 | 2/1955 | Ergen | 324—68 |

MAYNARD R. WILBUR, Primary Examiner

J. M. THESZ, Assistant Examiner

U.S. Cl. X.R.

324—68